April 15, 1952 J. E. BRIDGES 2,593,005

SYNCHRONIZED OSCILLATOR CIRCUIT

Filed Nov. 10, 1949 3 Sheets-Sheet 1

JACK E. BRIDGES
INVENTOR.
BY Francis W. Crotty
HIS ATTORNEY

April 15, 1952 J. E. BRIDGES 2,593,005

SYNCHRONIZED OSCILLATOR CIRCUIT

Filed Nov. 10, 1949 3 Sheets-Sheet 2

JACK E. BRIDGES
*INVENTOR.*

BY Francis W. Crotty

HIS ATTORNEY

April 15, 1952 J. E. BRIDGES 2,593,005
SYNCHRONIZED OSCILLATOR CIRCUIT
Filed Nov. 10, 1949 3 Sheets-Sheet 3

JACK E. BRIDGES
*INVENTOR.*

BY Francis W. Crotty
HIS ATTORNEY

Patented Apr. 15, 1952 2,593,005

UNITED STATES PATENT OFFICE 2,593,005

SYNCHRONIZED OSCILLATOR CIRCUIT

Jack E. Bridges, Cicero, Ill., assignor to Zenith Radio Corporation, a corporation of Illinois Application November 10, 1949, Serial No. 126,600

6 Claims. (Cl. 315—26)

This invention relates to oscillator circuits adapted to be synchronized with incoming synchronizing pulses or with an intermittent series of such pulses.

This invention finds ready application to a television receiver wherein it may be used to generate a deflection signal for controlling the sweep of the cathode-ray reproducing device utilized in such receivers, the frequency of this deflection signal being synchronized with received synchronizing signals. However, the invention is also useful in a variety of other electrical systems. For example, the oscillator of the present invention may be used as a frequency multiplier, and as such will generate a signal synchronized with received synchronizing pulses, but having a frequency that is some multiple of the repetition frequency of the pulses.

To overcome the deleterious effects of noise disturbances and other interfering signals on the scanning process of a television receiver, synchronizing systems for such receivers have been proposed that have some immunity to these disturbances. The chief disadvantage of these prior art synchronizing systems is that they are highly complicated and involve a large number of component stages. One prior system, for example, requires three distinct stages, namely a phase detector, a reactance-tube circuit, and an oscillator. Received synchronizing pulses are compared in the phase detector circuit with the output signal of the oscillator to produce a control signal. The control signal is applied to the reactance-tube circuit which, in turn, controls the frequency of the oscillator to maintain synchronism between its output signal and the received synchronizing pulses. This synchronized output signal is then utilized to control the sweep of the image reproducing tube.

The present invention provides an oscillator circuit that may be utilized to generate an output signal for controlling the scanning process of a television receiver, and this oscillator circuit has the feature that it may be readily synchronized with received synchronizing pulses without the need for separate phase detector, reactance-tube and other stages.

It is, accordingly, an object of this invention to provide an improved oscillator circuit that may be directly synchronized with received synchronizing pulses and does not require additional synchronizing stages.

A further object of this invention is to provide an improved oscillator circuit that may be directly synchronized with received synchronizing pulses, and which exhibits a high degree of immunity to noise disturbances and other unwanted signals, received concurrently with the synchronizing pulses.

A still further object of this invention is to provide an improved system for controlling the scanning process of a television receiver that is extremely accurate and reliable in operation and yet uses a minimum of circuit elements and stages.

The features of this invention which are believed to be new are set forth with particularity in the appended claims. The invention itself, however, together with further objects and advantages thereof may best be understood by reference to the following description when taken in conjunction with the accompanying drawings, in which:

Figure 1 illustrates the oscillator circuit of the invention in block form,

Figures 2–6 comprise various diagrams useful in understanding the invention,

Figure 1:
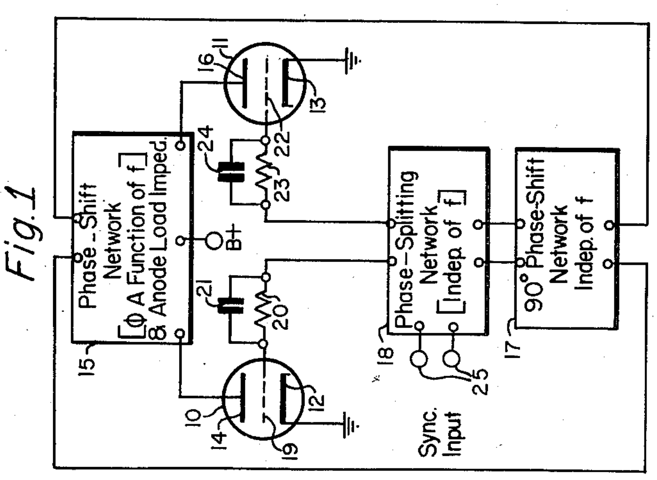

The circuit of Figure 1 comprises a pair of low mu electron-discharge devices 10 and 11 which may be conveniently combined as a double triode in a single envelope. The cathode 12 of device 10 is connected to ground and the cathode 13 of device 11 is similarly connected to ground. The anode 14 of device 10 is connected to one input terminal of a unit 15 and the anode 16 of device 11 is connected to a further input terminal of this unit. The circuitry of unit 15 is to be described in detail hereinafter, it is deemed sufficient at this point to state that this unit serves a dual purpose: firstly as an anode load impedance for deriving a push-pull output signal from the devices 10, 11; and secondly as a phase-shift network for controlling the phase of this push-pull output signal in accordance with its frequency.

The output terminals of unit 15 are connected to the input terminals of a phase-shift network 17. The network 17 is constructed to shift the phase of a signal applied thereto by 90° substantially independent of the frequency of this applied signal within the operating frequency range of the oscillator. The output terminals of the network 17 are connected to the input terminals of a phase-splitting network 18. One of the output terminals of network 18 is connected to the control electrode 19 of device 10 through a biasing network including a grid-leak resistor 20 shunted by a capacitor 21. A second output terminal of network 18 is connected to the control electrode 22 of device 11 through a biasing network including a grid-leak resistor 23 shunted by a capacitor 24. The phase splitting action of network 18 is substantially independent of frequency within the operating frequency range of the oscillator and this network acts in a manner to be fully described hereinafter, to advance the phase of the signal applied to its input terminals by 45° as applied to control electrode 19, and retard the phase of this signal by 45° as applied to control electrode 22, and thus supply feed-back signals to these control electrodes.

Synchronizing pulses are applied to the network 18 by way of terminals 25, these terminals being connected to any suitable synchronizing source (not shown). In a manner to be fully described hereinafter, the synchronizing pulses are translated by the network 18 and impressed in a push-push manner on control electrodes 19, 22 superposed on the feed-back signals supplied thereto through the network 18, the phase of the synchronizing pulses being unaltered by the network 18. The operation of the circuit of Figure 1 may best be understood by reference to Figures 2 and 3. Neglect for the moment the effect of the synchronizing pulses applied to terminals 25, and assume that the circuit of Figure 1 is oscillating at a free-running frequency $f$ substantially equal to the repetition frequency of the synchronizing pulses. The phase-shift network and load impedance 15 is constructed to have a phase-shift versus frequency characteristic as shown in Figure 3. At the free-running frequency $f$ this network preferably imparts zero phase shift to the signal translated thereby. At frequencies below the free-running frequency the phase shift of this network is leading and at frequencies above the free-running frequency the phase shift is lagging.

Figure 2:
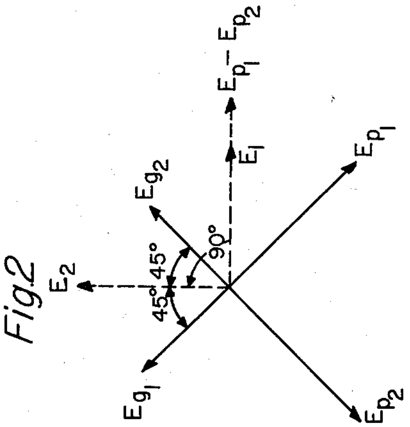
Figure 3:
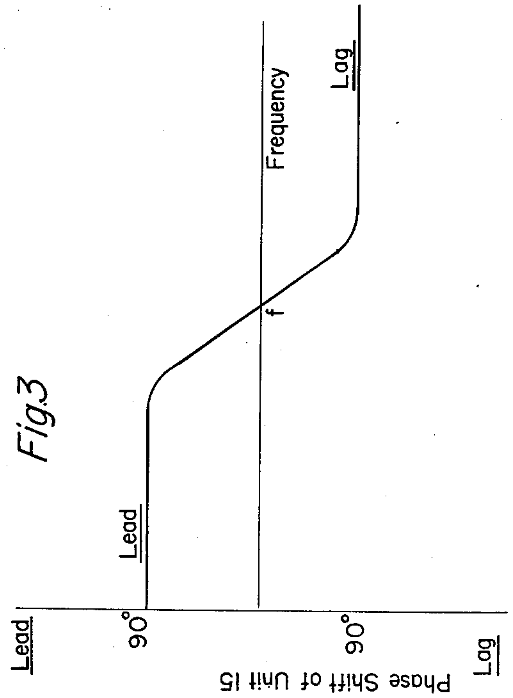

The devices 10, 11 generate individual output signals $E_{p1}$, $E_{p2}$ and the unit 15 derives from these individual output signals a push-pull output signal represented by the vector $E_{p1}—E_{p2}$ in Figure 2. This output signal is translated by the unit 15 with zero phase shift at the free-running frequency $f$, and this network produces a signal $E_1$ at its output terminals in phase with the push-pull output signal $E_{p1}—E_{p2}$, as shown in Figure 2.

The signal $E_1$ is shifted 90° in the network 17 and a signal $E_2$ is produced at the output terminals of this network, the signal $E_2$ being shown in Figure 2 displaced 90° from the signal $E_1$. The signal $E_2$ is split in the network 18 to produce a signal $E_{g1}$ for application to control electrode 19 leading $E_2$ by 45°, and to produce a signal $E_{g2}$ for application to control electrode 22 lagging $E_2$ by 45°.

Assume that the load impedance of unit 15 is resistive in nature, then the feedback signals $E_{g1}$, $E_{g2}$ respectively cause devices 10, 11 to produce individual output signals $E_{p2}$, $E_{p1}$ respectively displaced 180° therefrom. The network 18 produces the signals $E_{g1}$ and $E_{g2}$ of equal amplitude, and these signals bias the devices 10, 11 equally so that the output signals $E_{p1}$, $E_{p2}$ are also of equal amplitude. Under these conditions the phase of the push-pull output signal $E_{p1}—E_{p2}$ is as shown in the diagram of Figure 2 and when the parameters of the circuit are such that $E_{g1}$ and $E_{g2}$ have sufficient amplitude, oscillation is sustained in the circuit. Should the anode load impedance not be resistive in nature, it is merely necessary that the network 18 be constructed to impart a proper individual phase relation between the signals $E_{g1}$, $E_{g2}$ and the signals $E_{p1}$, $E_{p2}$ so that oscillation may be sustained.

For frequencies other than the free-running frequency $f$, the unit 15 imparts a phase shift to the signal translated thereby and $E_1$ leads or lags $E_{p1}—E_{p2}$ depending upon whether the instantaneous operating frequency is above or below the free-running frequency. Such a phase shift in the signal $E_1$ causes a corresponding phase shift in the signal $E_2$ and, thus, in the signals $E_{g1}$, $E_{g2}$ since the networks 17, 18 produce constant phase shift substantially independent of frequency. When the oscillator circuit is constructed so that the feedback signals $E_{g1}$ and $E_{g2}$ have sufficient amplitude to sustain stable oscillation in the circuit when the proper phase relation (as shown in Figure 2) exists between these signals and the signals $E_{p1}$, $E_{p2}$, the above-mentioned shift in phase between $E_1$ and $E_{p1}—E_{p2}$ causes signals $E_{g1}$, $E_{g2}$ no longer to sustain stable oscillation. Thus, in its free-running state the oscillator reaches a stable operating condition at the frequency $f$, at which frequency the unit 15 imparts zero phase-shift between the signal $E_1$ and the push-pull output signal $E_{p1}—E_{p2}$. It would of course be quite feasible to utilize networks 17 and 18 that impart phase shifts other than the absolute values designated herein, and to provide that the circuit of Figure 1 oscillates in its free-running state at a frequency at which the unit 15 shifts the phase of the signal $E_1$ relative to the signal $E_{p1}—E_{p2}$ a certain amount to sustain oscillation; the arbitrary values of phase shift utilized in the preceding discussion and the discussion to follow are for purposes of describing the operation of the circuit in a clear and distinct manner.

Figures 4, 5, 6, 7:
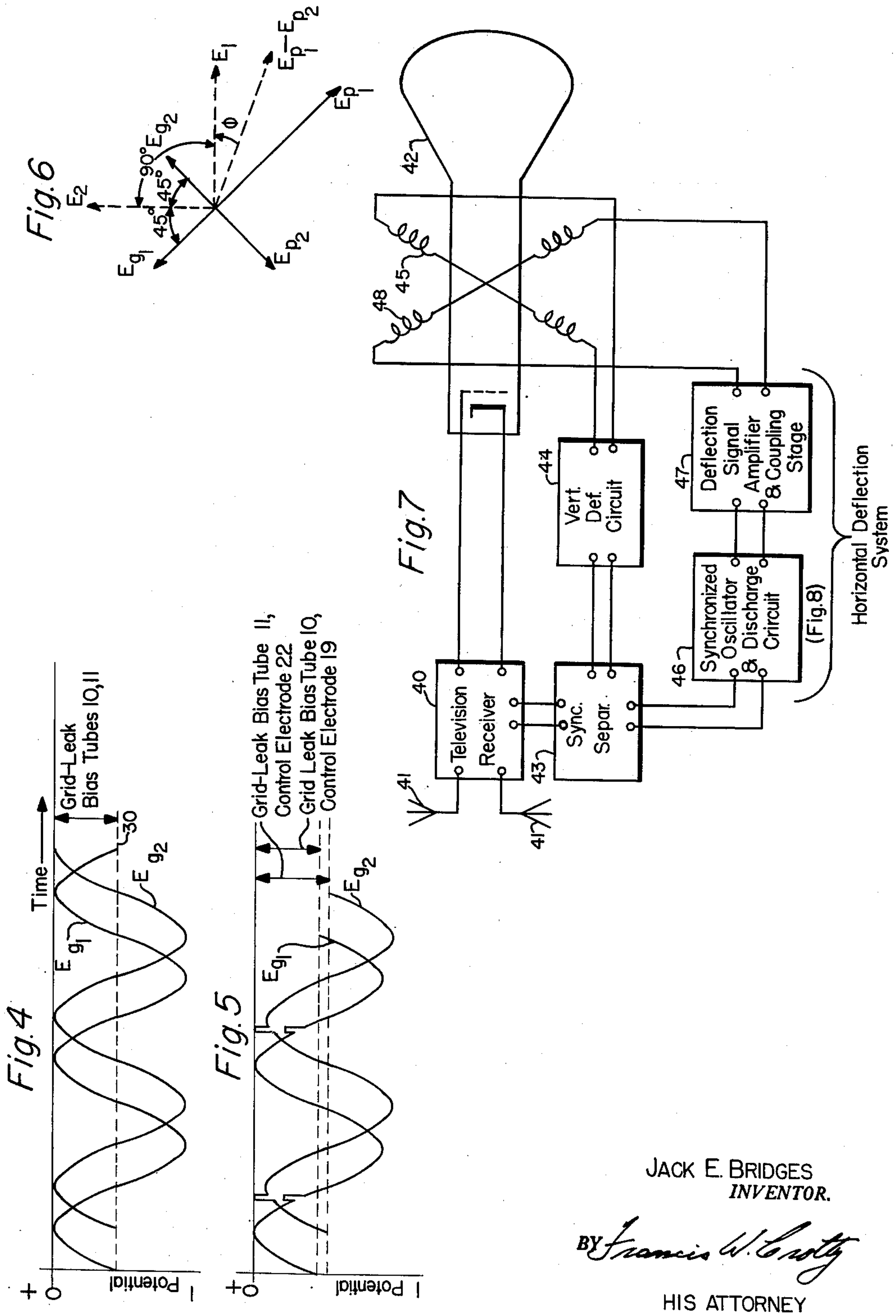
Figure 7 represents a television receiver incorporating the invention.

Reference is now made to Figures 4 and 5. Still neglecting the effect of the synchronizing pulses impressed on terminals 25, the instantaneous feedback signals supplied to the control electrodes 19, 22 by the unit 15 and networks 17, 18 are as shown in Figure 4 by the wave forms $E_{g1}$, $E_{g2}$. These waves establish an equal grid bias on the devices 10 and 11 as indicated by their common alternating current axis, this axis being displaced from the zero axis (above which grid current flows) by an amount determined by the amplitude of the waves $E_{g1}$, $E_{g2}$ and by the values given the various elements comprising networks 20, 21 and 23, 24.

Now, when synchronizing pulses having a repetition frequency substantially equal to the operating frequency $f$ of the oscillator are impressed across the terminals 25, these pulses are supplied to the control electrodes 19, 22 in a push-push manner superposed on the waves $E_{g1}$, $E_{g2}$ as shown in Figure 5. Due to the phase difference between the waves $E_{g1}$ and $E_{g2}$, the synchronizing pulses appear superposed on different portions of the respective waves. In the illustrated example, the synchronizing pulses are superposed on the wave $E_{g2}$ near its positive peak portion, and extend beyond this portion causing the grid bias on control electrode 22 to increase beyond its previous value and the alternating-current axis of the wave $E_{g2}$ to shift in a negative direction. On the other hand, the synchronizing pulses are superposed on the wave $E_{g1}$ in a positive sense near the center of the linear portions of this latter wave and do not extend beyond the positive peak portion of this wave. Therefore, in the illustrated condition the superposed synchronizing pulses do not affect the grid bias on control electrode 19, and the alternating-current axis of the wave $E_{g1}$ remains at its previously established position.

It is apparent, therefore, that the phase relation between the synchronizing pulses and the waves $E_{g1}$, $E_{g2}$ controls the relative bias on the control electrodes 19 and 22. With the phase relation illustrated in Figure 5, the bias on control electrode 22 is greater than that on control electrode 19. Should the frequency of the oscillator increase, the synchronizing pulses effectively shift up the slopes of the wave $E_{g2}$ and down the slopes of the wave $E_{g1}$, causing a corresponding increase in the bias on control electrode 22. On the other hand, should the frequency of the oscillator decrease, the synchronizing pulses would effectively shift down the slopes of the wave $E_{g2}$ and up the slopes of the wave $E_{g1}$, causing a corresponding decrease in the bias on control electrode 22. A further decrease in frequency of the oscillator would cause the bias on control electrode 22 to decrease further until the synchronizing pulses no longer extend beyond the positive peak portion of the waves $E_{g2}$ and any decrease in frequency beyond this point would then cause the bias on control electrode 19 to increase while the bias on control electrode 22 remains essentially fixed.

Therefore, any change in frequency of the oscillator circuit (or of the impressed synchronizing pulses) causes a corresponding change in the relative biases of devices 10, 11 depending upon the direction and magnitude of the frequency change. In accordance with the invention, the devices 10, 11 are operated in their variable transconductance range, so that any change in grid bias causes a corresponding change in the relative amplitudes of the individual output signals $E_{p1}$, $E_{p2}$ appearing at their respective anodes.

Figure 6 shows a vector diagram of the circuit of Figure 1, when the frequency of this circuit is synchronized with synchronizing pulses applied to the terminals 25. It is assumed that the repetition frequency of the synchronizing pulses is slightly lower than the free-running frequency $f$ of the oscillator, and the oscillator frequency is synchronized at this slightly lower frequency with a phase relation existing between the synchronizing pulses and the feedback waves $E_{g1}$, $E_{g2}$ is as shown in Figure 5.

Therefore, when these synchronizing pulses are applied to terminals 25, the bias of device 11 increases relative to the bias of device 10, as previously explained, and the amplitude of the output signal $E_{p2}$ accordingly decreases relative to the amplitude of the output signal $E_{p1}$ Therefore, the push-pull output signal $E_{p1}$—$E_{p2}$ derived by the unit 15 shifts in phase from its position in Figure 2 to the position shown in Figure 6. To re-establish the proper phase relation between the feedback signals $E_{g1}$, $E_{g2}$ and the output signals $E_{p1}$, $E_{p2}$ so that stable oscillation may be sustained, it can be seen from Figure 3 that the oscillator frequency must decrease from its free-running frequency $f$ to a new frequency at which the unit 15 provides a leading phase relation between the signal $E_1$ and the push-pull output signal $E_{p1}$—$E_{p2}$ required to place feedback signals $E_{g1}$ and $E_{g2}$ back in proper phase to sustain stable oscillation. The frequency of the oscillator circuit is maintained at this synchronized frequency, and any tendency towards frequency drifts away from this frequency is prevented in a manner now to be described.

Should the frequency of the oscillator tend to increase beyond the repetition frequency of the synchronizing pulses, the pulses shift up the slope of the wave $E_{g2}$, and down the slope of the wave $E_{g1}$. Reference to Figure 5 will indicate that this shift tends to increase further the bias of device 11 relative to the bias of device 10, and thus to decrease further the amplitude of the output signal $E_{p2}$ relative to the output signal $E_{p1}$. This, in turn, causes the vector of the push-pull output signal $E_{p1}$—$E_{p2}$ to rotate in a clockwise direction, and the frequency of the oscillator to decrease (in accordance with the curve of Figure 3) so that the unit 15 may provide the proper increased phase angle to sustain stable oscillation. Thus, any tendency of the oscillator frequency to increase beyond the repetition frequency of the synchronizing pulses sets up a chain of operations that tends to prevent such an increase in frequency. Similarly, should the frequency of the oscillator tend to decrease below the repetition frequency of the synchronizing pulses, the bias of the device 11 decreases relative to the bias of device 10, increasing the amplitude of the signal $E_{p2}$ relative to the signal $E_{p1}$. This causes the vector $E_{p1}$—$E_{p2}$ to rotate in a counterclockwise direction, and the frequency of the oscillator to increase so that unit 15 may provide a decreased phase angle $\phi$ to sustain stable oscillation. Thus, any tendency of the oscillator frequency to decrease below the repetition frequency of the synchronizing pulses is similarly prevented. In this manner the synchronizing pulses synchronize the frequency of the oscillator circuit, the synchronizing range being determined by the sloped portion of the curve of Figure 3. The slope of the sloping portion of the curve of Figure 3, in turn, is a function of the quality factor Q of the unit 15 as is well understood in the art.

The circuit of Figure 1 may be considered as a push-pull oscillator of modified type since, unlike usual push-pull oscillators, the feedback components $E_{g1}$, $E_{g2}$ and the output signals $E_{p1}$, $E_{p2}$ have a phase relation that is other than 180°. This is a requirement of the embodiment of the invention illustrated in Figure 1, and is necessary in order that changes in the relative amplitudes of $E_{p1}$ and $E_{p2}$ cause a corresponding phase shift in the push-pull output signal $E_{p1}$—$E_{p2}$.

Since the synchronizing pulses are applied to the circuit of Figure 1 in push-pull, they cancel in the load impedance portion of unit 15 and do not interfere with the push-pull output signal of the oscillator circuit. Moreover, random noise signals, received concurrently with the synchronizing pulses and impressed on the control electrodes of devices 10, 11 charge the capacitors 21, 24 by substantially equal amounts and have little effect on the relative amplitudes of the output signals $E_{p1}$, $E_{p2}$. Consequently, such noise signals do not interfere materially with the operation of the circuit.

The characteristics of the circuit components of the oscillator of Figure 1, and particularly the quality factor of the phase shift network portion of unit 15, are preferably chosen so that the oscillator is highly stable in operation. Furthermore, it is desirable to construct the oscillator so that its free-running frequency is nearly identical to the repetition frequency of the synchronizing pulses. In this manner, with the oscillator so constructed, it will continue to oscillate at substantially the synchronized frequency even during short intervals when the synchronizing pulses are partially or completely lost in background noise, and synchronism is not destroyed during these intervals.

The system of Figure 7 includes a unit 40 designated "television receiver," and this receiver contains the well known radio-frequency amplifier, intermediate-frequency amplifier, video detector and video amplifier, sound detector and sound amplifier stages utilized in present-day television receivers. The input terminals of the television receiver 40 may be connected to a suitable antenna circuit 41, and the output terminals of the receiver are connected to the control electrode and cathode of a receiver image tube 42 to control the intensity of the cathode-ray in this tube in accordance with the video-frequency components of a received television signal.

The synchronizing-signal components of the received television signal are separated from the video-signal components in a synchronizing-signal separator 43 having input terminals connected to the receiver 40. The synchronizing signal separator 43 is connected to a vertical deflection circuit 44 which, in turn, is connected to the vertical deflection coils 45 of tube 42. The synchronizing signal separator 43 is further connected to a synchronized oscillator and discharge circuit 46, constructed in accordance with the invention, and the circuit 46 is connected to a usual deflection signal amplifier and coupling stage 47. The output terminals of stage 47 are connected to the horizontal deflection coils 48 of the image reproducing tube 42.

The system of Figure 7, apart from the circuit 46, operates in a conventional manner. Vertical synchronizing pulses from the separator 43 control the operation of the vertical deflection circuit 44 which generates a vertical deflection signal that is synchronized with these vertical synchronizing pulses. This vertical deflection signal is applied to the deflection coils 45 to control the vertical sweep of the cathode-ray in device 42.

Horizontal synchronizing pulses from the separator 43 are used to control the oscillator 46 which generates a horizontal deflection signal synchronized with these horizontal synchronizing pulses. The horizontal deflection signal is amplified and applied to the deflection coils 48 through the amplifier and coupling stage 47, and this deflection signal controls the horizontal sweep of the cathode-ray in device 42.

Therefore, the cathode ray in device 42 has its intensity modulated in accordance with the video-frequency components of a received television signal, and the sweep of this ray is controlled by the synchronizing-signal components of this television signal. Accordingly, the device 42 reproduces the image represented by the television signal.

Figures 8, 9, 10, 11:
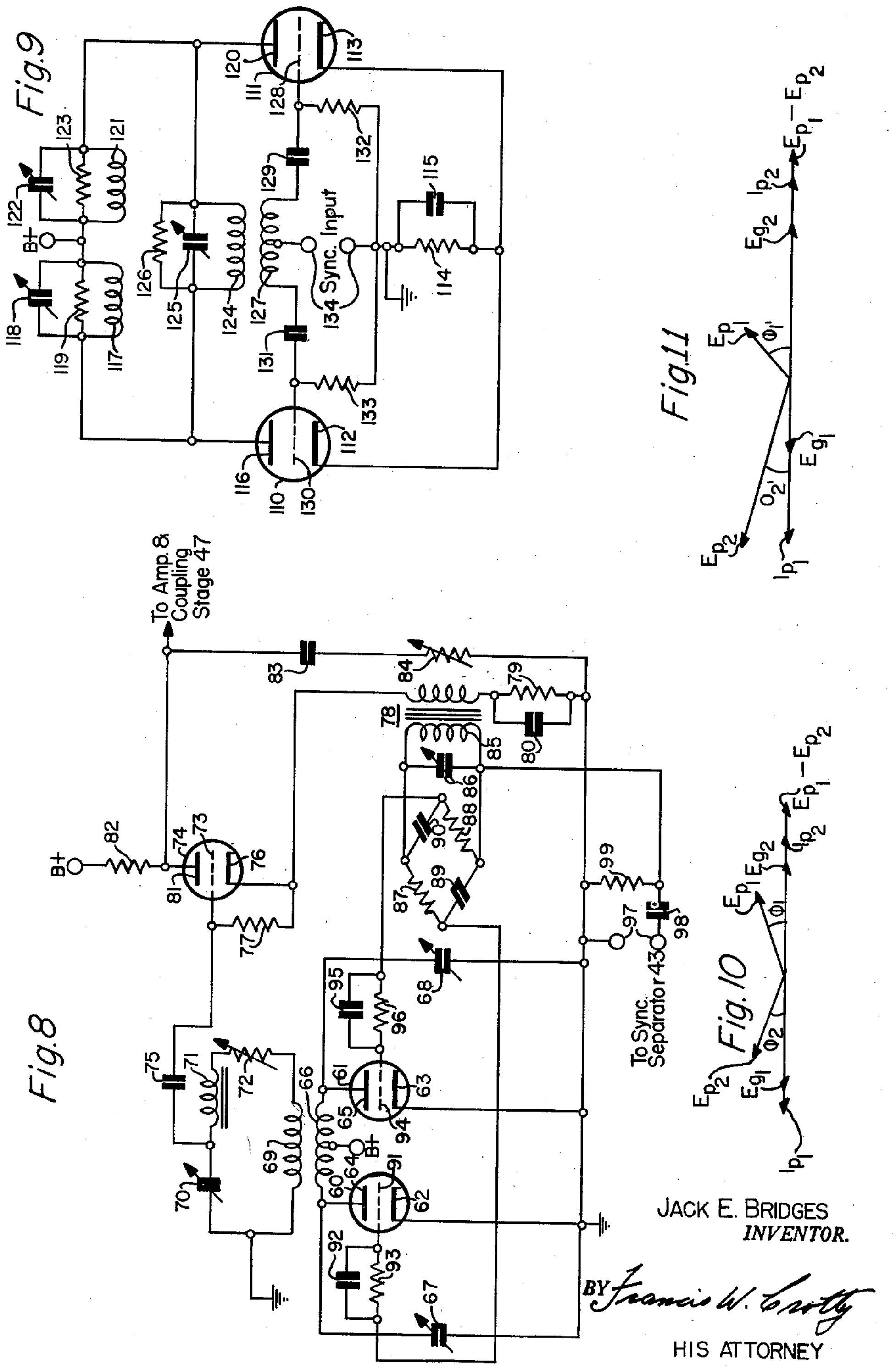
Figure 8 is a schematic diagram of one embodiment of the invention.
Figure 9 is a schematic diagram of a second embodiment of the invention.
Figures 10 and 11 are vector diagrams useful in understanding the circuit of Figure 9.

One embodiment of the synchronized oscillator of the present invention is illustrated schematically in Figure 8. The circuit of Figure 8 includes a pair of electron-discharge devices 60, 61 which may be included, when so desired, in a single envelope. The cathode 62 of device 60 and cathode 63 of device 61 are connected to ground. The anode 64 of device 60 is coupled to the anode 65 of device 61 through an inductance coil 66. The center tap of coil 66 is connected to the positive terminal B+ of a source of unidirectional potential whose negative terminal is connected to ground. The coil 66 is shunted by a pair of series-connected capacitors 67, 68 the junction of which is connected to ground, these capacitors forming a tuned circuit with the coil 66.

An inductance coil 69 is inductively coupled to the coil 66, one side of the coil 69 being connected to ground. A series-tuned circuit including a capacitor 70 and inductance coil 71 is connected through a resistor 72 across the extremities of coil 69. The junction of capacitor 70 and coil 71 is coupled to the control electrode 73 of an electron-discharge device 74 through a capacitor 75. The control electrode 73 is connected to the cathode 76 of device 74 through a grid-leak resistor 77. The cathode 76 is connected to ground through the primary winding of a transformer 78 and through a resistor 79, the resistor 79 being shunted by a capacitor 80. The anode 81 of device 74 is connected to the positive terminal B+ of a source of unidirectional potential through a load resistor 82. The anode 81 may be connected to the amplifier and coupling stage 47 of Figure 7, and is coupled to ground through a series-connected capacitor 83 and variable peaking resistor 84.

A secondary winding 85 of transformer 78 is shunted by a capacitor 86 to form a tuned circuit. The winding 85 is further connected to two terminals of a phase-splitting bridge network comprising resistors 87, 88 and capacitors 89, 90, connected as shown. A third terminal of the phase-splitting network is connected to the control electrode 91 of discharge device 60 through parallel-connected capacitor 92 and grid-leak resistor 93. A fourth terminal of the phase-splitting network is connected to control electrode 94 of discharge device 61 through parallel connected capacitor 95 and grid-leak resistor 96.

Horizontal-synchronizing pulses from the synchronizing signal separator 43 of Figure 7 are applied to the circuit of Figure 8 by way of terminals 97. One of the terminals 97 is connected to ground and the other is coupled to a terminal of the phase-splitting network 87—90 through a capacitor 98, the last-mentioned terminal of the phase splitting network being connected to ground through a resistor 99.

The circuit of Figure 8 is a schematic representation of the circuit of Figure 1, the additional circuit of discharge device 74 being included therein for purposes to be described. The network 66—68 represents the load impedance and phase shifting unit 15 of Figure 1. This network derives the push-pull output signal $E_{p1}$—$E_{p2}$ from the oscillator circuit. Furthermore, the network 66—68 is tuned to be resonant at the free-running frequency $f$ of the oscillator and supplies the output signal $E_1$ to the network 69—72, the signal $E_1$ being in phase with the push-pull output signal $E_{p1}$—$E_{p2}$ at the free-running frequency of the oscillator, and leading or lagging the signal $E_{p1}$—$E_{p2}$ when the frequency of the oscillator is below or above this free-running frequency.

The network 69—72 corresponds to the phase-shifting network 17 of Figure 1, and this network is tuned to be series-resonant at the free-running frequency $f$ of the oscillator. The signal $E_2$ may be derived across the capactor 70, this signal leading $E_1$ by 90° at the free-running frequency. As pointed out in the previous discussion, it is required that the phase relation between the signals $E_1$ and $E_2$ remain constant for frequency variations, and this is substantially the case with the network 69—72 within the operating frequency range of the oscillator. Slight phase adjustment between the signals $E_1$ and $E_2$ may be made by adjusting the value of the variable resistor 72, included in the series-resonant circuit.

The signal $E_2$ is applied to the control electrode 73 of discharge device 74, this device acting as a discharge tube for capacitor 83 and also as an amplitude stabilizer for the signal $E_2$. The device 74 is biased to operate as a class C amplifier, and current pulses flow in its anode and cathode circuits in response to the positive peak portions of the signal $E_2$ applied to its control electrode. The current pulses in the cathode circuit of the device flow through the primary winding of transformer 78 and induce a sine-wave signal in the tuned circuit 85, 86 this circuit similarly being tuned to the free-running frequency $f$ of the oscillator. These current pulses are amplitude-limited by the circuit of device 74, so that the sine wave in the circuit 85, 86 has a substantially constant amplitude.

The sine-wave signal from the tuned circuit 85, 86 is applied to the phase-splitting network 87—90 which corresponds to the network 18 of Figure 1. The network 87—90 advances the sine wave signal 45° as applied to control electrode 91 of device 60, and retards this signal 45° as applied to control electrode 94 of device 61, to provide feed-back signals to these devices. The phase splitting action of the network 87—90 is substantially independent of frequency for frequencies within the operating frequency range of the oscillator circuit. Received synchronizing pulses are impressed across the terminals 97, and these synchronizing pulses are supplied to the control electrodes 91 and 94 in a push-pull manner by way of the network 87—90, and superposed on the feed-back signals in the manner previously described.

The signal $E_2$ applied to the control electrode 73 of device 74 causes the device to become conductive during positive peak portions of this signal, since the device is biased to operate as a class C amplifier. The device 74 additionally acts as a discharge tube for the capacitor 83, periodically discharging this capacitor and providing a saw-tooth deflection signal for application to the amplifier stage 47 of Figure 7. The wave shape of this deflection signal may be controlled in well-known manner by adjustment of the variable peaking resistor 84 connected in series with capacitor 83.

As previously pointed out, the oscillator circuit may be constructed to oscillate in a highly stable manner, and even during periods when the synchronizing pulses are of low amplitude and lost in the background noise, the circuit continues to control the scanning of the receiver reproducing device at substantially the required frequency. Moreover, as also pointed out, noise or other disturbances have no material effect on the synchronization of the oscillator with the received synchronizing pulses. The free-running frequency of the oscillator is made substantially equal to the repetition frequency of the synchronizing pulses and, in the aforedescribed manner, these pulses synchronize the oscillator to their repetition frequency.

A second embodiment of the synchronized oscillator of the present invention is illustrated in Figure 9. This latter embodiment includes a pair of electron-discharge devices 110 and 111. The cathodes 112 and 113 of devices 110 and 111 are connected to ground through a resistor 114 shunted by a capacitor 115. The anode 116 of device 110 is connected to the positive terminal B+ of a source of unidirectional potential through a parallel-tuned circuit comprising an inductance coil 117, capacitor 118 and resistor 119, and tuned to a frequency slightly above the free-running frequency of the oscillator circuit. The anode 120 of device 111 is connected to the positive terminal B+ through a parallel-tuned circuit comprising an inductance coil 121, capacitor 122 and resistor 123, and tuned to a frequency displaced below the free-running frequency $f$ of the oscillator an amount equal to the displacement of the frequency to which the first-mentioned parallel-tuned circuit is tuned above the free-running frequency of the oscillator. For example, assuming that the free-running frequency $f$ of the oscillator is 16 kc., the first-mentioned circuit may be tuned to 20 kc. and the last mentioned circuit may be tuned to 12 kc.

A third parallel tuned circuit comprising inductance coil 124, capacitor 125 and resistor 126 is connected across the above-mentioned two tuned circuits, and this third circuit is tuned to the free-running frequency of the oscillator so that it is resistive in nature at this frequency and substantially resistive for frequencies within the operating frequency range of the oscillator. An inductance coil 127 is inductively coupled to the coil 124, and one extremity of coil 127 is coupled to control electrode 128 of device 111 through a capacitor 129, and the other to control electrode 130 of device 110 through a capacitor 131. The control electrodes 128 and 130 are connected to ground through respective grid-leak resistors 132 and 133. Incoming synchronizing pulses may be impressed across terminals 134 connected to the mid-point of coil 127 and to ground.

The operation of the circuit of Figure 9 may best be understood by reference to Figures 10 and 11. Figure 10 shows vectorially the signal relationships existing in the circuit of Figure 9 when it is oscillating at its free-running frequency, that is, when no synchronizing pulses are impressed across terminals 134. As shown in Figure 10, this circuit operates as a push-pull oscillator, and the current $I_{p1}$ flowing through the device 110 is 180° out of phase with the current $I_{p2}$ flowing through device 111. The current $I_{p1}$ gives rise to an output signal $E_{p1}$ across the tuned circuit 117—118, the signal $E_{p1}$ being displaced in phase from $I_{p1}$ by an angle $180°-\phi_1$ due to the fact that this circuit is tuned to a frequency above the free-running frequency $f$ of the oscillator. The current $I_{p2}$ gives rise to an output signal $E_{p2}$ across the tuned circuit 121—122, signal $E_{p2}$ being displaced from $I_{p2}$ an angle $180°+\phi_2$, $\phi_2$ being equal to $\phi_1$ due to the fact that this latter circuit is tuned to a corresponding frequency below the free-running frequency of the oscillator. The push-pull output signal $E_{p1}$—$E_{p2}$ is in phase with the current $I_{p2}$ under these conditions, since $E_{p1}=E_{p2}$ and $\phi_1=\phi_2$. The signal $E_{p1}$—$E_{p2}$ appears across the tuned circuit 124—125 and is induced into the coil 127. Since the extremities of coil 127 are coupled to the control electrodes 128, 130, an in-phase signal $E_{g2}$ appears across the resistor 133 and a 180° out-of-phase signal $E_{g1}$ appears across the resistor 132. It can be seen from the diagram that the signals $E_{g1}$ and $E_{g2}$ are in proper phase to sustain oscillation, and appropriate circuit parameters are used so that $E_{g1}$ and $E_{g2}$ have sufficient amplitude to enable the circuit of Figure 9 to oscillate as a push-pull oscillator at the free-running frequency $f$.

Now assume that synchronizing pulses having a repetition frequency slightly lower than the free-running frequency of the oscillator are impressed across terminals 134. These synchronizing pulses are supplied to the control electrodes 128, 130 in push-push and superposed on the signals $E_{g1}$ and $E_{g2}$, as in the previous embodiment. The devices 110 and 111 are operated in the variable transconductance range of their characteristics, so that the application of the synchronizing pulses to the terminals 134 causes the amplitude of the output signal $E_{p2}$ to increase relative to the output signal $E_{p1}$, in the previously described manner. Now, unless the frequency of the oscillator shifts from a free-running frequency, the push-pull output signal $E_{p1}$—$E_{p2}$ will no longer be in phase with the current $I_{p2}$ and the feed-back signals $E_{g1}$, $E_{g2}$ will no longer be in proper phase to sustain oscillation. Therefore, the frequency of the oscillator decreases towards the repetition frequency of the synchronizing pulses to establish the signal relations shown in Figure 11. That is, the oscillator frequency decreases to a value wherein the phase displacement $\phi'_2$ of the signal $E_{p2}$ appearing across the low-frequency tuned circuit 121—122 has a decreased value, and the phase displacement $\phi'_1$ of the signal $E_{p1}$ appearing across the high-frequency tuned circuit 117—118 has an increased value, so that the push-pull output signal $E_{p1}$—$E_{p2}$ is again in phase with $I_{p2}$ and oscillation is now sustained in the oscillator at the repetition frequency of the synchronizing pulses. As previously described in conjunction with the first embodiment of the invention, any tendency of the oscillator frequency to drift from this synchronized frequency causes a corresponding change in the relative amplitudes of signals $E_{p1}$ and $E_{p2}$. This causes a change in phase in the push-pull output signal $E_{p1}$—$E_{p2}$ and a corresponding shift in frequency of the oscillator to oppose this tendency.

The embodiment of the invention shown in Figure 9 can be constructed to be highly stable in operation, and when the free-running frequency $f$ of the oscillator is made substantially equal to the repetition frequency of the synchronizing pulses, the oscillator continues to oscillate at substantially the synchronized frequency during intervals when the synchronizing pulses are of low amplitude and lost in background noise.

In addition, the synchronizing pulses are applied in push-push to the oscillator of Figure 9 and cancel in the output signal of the oscillator. Random noise signals received concurrently with the synchronizing pulses charge the capacitors 129, 131 by substantially equal amounts so that these noise signals have no material effect on the synchronizing of the oscillator circuit.

The present invention provides, therefore, improved oscillator circuits capable of being synchronizing with received synchronizing pulses without the need for additional synchronizing stages. Moreover, this invention provides improved synchronized oscillator circuits that are highly stable and have a high degree of immunity to noise disturbances and other unwanted signals received concurrently with the synchronizing pulses.

While particular embodiments of the invention have been shown and described modifications may be made and it is intended in the appended claims to cover all such modifications that fall within the true spirit and scope of the invention.

I claim:

1. A push-pull oscillator circuit to be synchronized with received synchronizing pulses comprising: a pair of electron-discharge devices having individual output electrodes and input electrodes; a first network coupled to said output electrodes of said devices for deriving a push-pull output signal having a phase determined by the relative biases of said devices and for imparting a phase-shift to said output signal that is a function of the frequency of said oscillator; a phase-splitting network coupled to said first network for producing two distinct feed-back signals having a phase relation with respect to each other that is substantially independent of the frequency of said oscillator; a biasing network coupled to said phase-splitting network for applying one of said feed-back signals to the input electrodes of one of said devices and the other of said feed-back signals to the input electrodes of the other of said devices to sustain oscillation in said oscillator at a frequency dependent on the phase of said output signal; and means for supplying said synchronizing pulses to said biasing network for push-push application to said input electrodes of said devices superposed on said two feed-back signals to control the relative biases of said devices in accordance with the phase relation between said synchronizing pulses and said feed-back signals.

2. A push-pull oscillator circuit to be synchronized with received synchronizing pulses comprising: a pair of electron-discharge devices having individual output electrodes and input electrodes; a first network coupled to said output electrodes of said devices for deriving a push-pull output signal having a phase determined by the relative biases of said devices and for imparting a phase-shift to said output signal that is a function of the frequency of said oscillator; a second network coupled to said first network for shifting the phase of the signal from said first network by substantially 90°; a phase-splitting network coupled to said second network for producing two distinct feed-back signals respectively leading and lagging the signal from said second network by predetermined equal amounts substantially independent of the frequency of said oscillator; a biasing network coupled to said phase-splitting network for applying one of said feed-back signals to the input electrodes of one of said devices and the other of said feed-back signals to the input electrodes of the other of said devices to sustain oscillation in said oscillator at a frequency dependent on the phase of said output signal; and means for supplying said synchronizing pulses to said biasing network for push-push application to said input electrodes of said devices superposed on said two feed-back signals to control the relative biases of said devices in accordance with the phase relation between said synchronizing pulses and said feed-back signals.

3. A push-pull oscillator circuit to be synchronized with received synchronizing pulses comprising: a pair of electron-discharge devices each including an anode and a control electrode; an output network tuned to the free-running frequency of said oscillator coupled to the anodes of said devices for deriving a push-pull output signal having a phase determined by the relative biases of said devices and for imparting a phase-shift to said output signal of a magnitude and sense dependent on the magnitude and sense of frequency deviations of said oscillator from said free-running frequency; a series-resonant network tuned to said free-running frequency coupled to said output network for deriving a signal substantially in phase quadrature with the signal from said output network for frequencies within the frequency range of said oscillator; a resistance-capacity phase-splitting network coupled to said series-resonant network for producing two distinct feed-back signals respectively leading and lagging the signal from said series-resonant network by predetermined equal amounts substantially constant within the frequency range of said oscillator; a biasing network coupled to said phase-splitting network for applying one of said feed-back signals to the control electrode of one of said devices and the other of said feed-back signals to the control electrode of the other of said devices to sustain oscillation in said oscillator at a frequency dependent on the phase of said output signal; and means for supplying said synchronizing pulses to said biasing network for push-push application to said control electrodes of said devices superposed on said two feed-back signals to control the relative biases of said devices in accordance with the phase relation between said synchronizing pulses and said feed-back signals.

4. A push-pull oscillator circuit to be synchronized with received synchronizing pulses comprising: a pair of electron-discharge devices having individual input electrodes and output electrodes; a first network coupled to said output electrodes of said devices for deriving a push-pull signal having a phase determined by the relative biases of said devices and for imparting a phase-shift to said signal that is a function of the frequency of said oscillator; a second network coupled to said first network for shifting the phase of the signal from said first network by substantially 90°; a third network coupled to said second network, including an electron discharge device, for obtaining an output signal from said oscillator and for limiting the amplitude of the signal from said second network; a phase-splitting network coupled to said third network for producing two distinct feed-back signals respectively leading and lagging the stabilized signal from said third network by predetermined equal amounts substantially independent of the frequency of said oscillator; a biasing network coupled to said phase-splitting network for applying one of said feed-back signals to the input electrodes of one of said devices and the other of said feed-back signals to the input electrodes of the other of said devices to sustain oscillation in said oscillator at a frequency dependent on the phase of said output signal; and means for supplying said synchronizing pulses to said biasing network for push-push application to said input electrodes of said devices superposed on said two feed-back signals to control the relative biases of said devices in accordance with the phase relation between said synchronizing pulses and said feed-back signals.

5. A circuit for use in a television receiver for synchronizing the sweep of a cathode-ray image reproducing device with received synchronizing pulses comprising: a pair of electron-discharge devices having individual input electrodes and output electrodes; a first network coupled to said output electrodes of said devices for deriving a push-pull signal from the circuit of said devices having a phase determined by the relative biases of said devices and for imparting a phase-shift to said signal that is a function of the frequency of said oscillator; a second network coupled to said first network for shifting the phase of the signal from said first network by substantially 90°; a third network coupled to said second network, including an electron discharge device, for deriving a sweep signal synchronized with the signal from said second network; means for applying said sweep signal to said image-reproducing device to control the sweep of the cathode-ray therein; a phase-splitting network coupled to said third network for producing two distinct feed-back signals respectively leading and lagging the signal from said second network by predetermined equal amounts substantially independent of the frequency of said oscillator; a biasing network coupled to said phase-splitting network for applying one of said feed-back signals to the input electrodes of one of said devices and the other of said feed-back signals to the input electrodes of the other of said devices to sustain oscillation in said oscillator at a frequency dependent on the phase of said output signal; and means for supplying said synchronizing pulses to said biasing network for push-push application to said input electrodes of said devices superposed on said two feed-back signals to control the relative biases of said devices in accordance with the phase relation between said synchronizing pulses and said feed-back signals.

6. A push-pull oscillator circuit to be synchronized with received synchronizing pulses comprising: a pair of electron-discharge devices having individual output electrodes and input electrodes; a first network, including a pair of resonant circuits tuned respectively to frequencies equally displaced above and below the free-running frequency of said oscillator, for deriving individual output signals from said devices having relative amplitudes dependent upon the relative biases of said devices and for imparting respective phase shifts to said individual output signals determined by the frequency of said oscillator; a second network coupled to said first network for deriving a push-pull signal from said individual signals; a phase-splitting network coupled to said second network for producing two distinct feed-back signals displaced in phase by substantially 180°; a biasing network coupled to said phase-splitting network for applying one of said feed-back signals to the input electrodes of one of said devices and the other of said feed-back signals to the input electrodes of the other of said devices to sustain oscillation in said oscillator at a frequency dependent on the relative amplitudes of said individual output signals; and means for supplying said synchronizing pulses to said biasing network for push-push application to said input electrodes of said devices superposed on said two feed-back signals to control the relative biases of said devices in accordance with the phase relation between said synchronizing pulses and said feed-back signals.

JACK E. BRIDGES.

REFERENCES CITED

The following references are of record in the file of this patent:

UNITED STATES PATENTS

| Number | Name | Date |
|---|---|---|
| 1,867,567 | Hansell | July 19, 1932 |
| 2,079,134 | Terman | May 4, 1937 |
| 2,102,419 | Klutke | Dec. 14, 1937 |
| 2,415,773 | Vilkomerson | Feb. 11, 1947 |
| 2,440,538 | Chalberg | Apr. 27, 1948 |
| 2,444,338 | Dimond | June 29, 1948 |
| 2,471,246 | Smith | May 24, 1949 |